United States Patent
Cohen et al.

(10) Patent No.: US 7,127,560 B2
(45) Date of Patent: Oct. 24, 2006

(54) METHOD OF DYNAMICALLY CONTROLLING CACHE SIZE

(75) Inventors: Erwin B. Cohen, South Burlington, VT (US); Thomas E. Cook, Essex Junction, VT (US); Ian R. Govett, Richmond, VT (US); Paul D. Kartschoke, Williston, VT (US); Stephen V. Kosonocky, Wilton, CT (US); Peter A. Sandon, Essex Junction, VT (US); Keith R. Williams, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 10/605,616

(22) Filed: Oct. 14, 2003

(65) Prior Publication Data

US 2005/0080994 A1  Apr. 14, 2005

(51) Int. Cl.
*G06F 12/00* (2006.01)
(52) U.S. Cl. .................. 711/141; 711/129; 707/201
(58) Field of Classification Search ......... 711/113–146
See application file for complete search history.

(56) References Cited

U.S. PATENT DOCUMENTS

| | | | |
|---|---|---|---|
| 5,761,715 A * | 6/1998 | Takahashi | 711/128 |
| 6,421,809 B1 * | 7/2002 | Wuytack et al. | 716/2 |
| 6,845,432 B1 * | 1/2005 | Maiyuran et al. | 711/154 |
| 2003/0061448 A1 * | 3/2003 | Rawson | 711/133 |
| 2003/0145239 A1 * | 7/2003 | Kever et al. | 713/300 |
| 2003/0236948 A1 * | 12/2003 | Erdner et al. | 711/134 |

* cited by examiner

*Primary Examiner*—Donald Sparks
*Assistant Examiner*—Hashem Farrokh
(74) *Attorney, Agent, or Firm*—Scully, Scott, Murphy & Presser, P.C.; Michael LeStrange, Esq.

(57) ABSTRACT

A power saving cache and a method of operating a power saving cache. The power saving cache includes circuitry to dynamically reduce the logical size of the cache in order to save power. Preferably, a method is used to determine optimal cache size for balancing power and performance, using a variety of combinable hardware and software techniques. Also, in a preferred embodiment, steps are used for maintaining coherency during cache resizing, including the handling of modified ("dirty") data in the cache, and steps are provided for partitioning a cache in one of several way to provide an appropriate configuration and granularity when resizing.

15 Claims, 6 Drawing Sheets

8 WAY ASSOCIATIVE CACHE - BINARY WEIGHTED POWER PARTITIONS

8 WAY ASSOCIATIVE CACHE - 1/2 CACHE POWER SAVING

8 WAY ASSOCIATIVE CACHE - LINEAR PARTITIONS

8 WAY ASSOCIATIVE CACHE - BINARY WEIGHTED POWER PARTITIONS

METHOD OF DYNAMICALLY CONTROLLING CACHE SIZE

BACKGROUND OF INVENTION

1. Field of the Invention

This invention generally relates to microprocessor caches, and more specifically, to dynamically controlling cache size.

2. Background Art

There is an industry wide drive to lower power consumption in microprocessors for improved performance, speeds, battery life, environmental needs, power supply limitations, etc. Due to the shrinking geometry, advanced CMOS processors have increasingly higher leakage currents and thus static power dissipation. High performance processors are increasing in complexity according to "Moore's Law" (complexity doubles every eighteen months) increasing the number of transistors and thus power consumption. Additionally, processor caches are growing at a rate faster than that of the processor logic. The net result is that the caches are consuming a larger portion of the processor's power.

Currently, the cache size and cache power consumption remain constant during microprocessor usage. Furthermore, during low power operation, the full DC portion of the power consumption is still dissipated, serving no purpose.

SUMMARY OF INVENTION

An object of this invention is to provide a method and apparatus for powering down sections of a microprocessor cache to minimize power consumption, while not impacting performance when high performance is required.

Another object of the invention is to minimize leakage power from a microprocessor cache when full performance of the microprocessor is not required.

These and other objectives are attained with a power saving cache and a method of operating a power saving cache. The power saving cache includes circuitry to dynamically reduce the logical size of the cache in order to save power. Preferably, a procedure is used to determine optimal cache size for balancing power and performance, using a variety of combinable hardware and software techniques.

Also, in a preferred embodiment, steps are taken for maintaining coherency during cache resizing, including the handling of modified ("dirty") data in the cache. Procedures may be provided for partitioning a cache in one of several ways to provide an appropriate configuration and granularity.

Further benefits and advantages of the invention will become apparent from a consideration of the following detailed description, given with reference to the accompanying drawings, which specify and show preferred embodiments of the invention.

DETAILED DESCRIPTION

Partitioning Caches for Power Savings

In accordance with the present invention, to realize the power savings, the cache arrays of a processor are designed such that they can be partially powered off without compromising data integrity or system operation. Two specific methods, referred to as "horizontal" and "vertical" partitioning, are described below in detail.

Horizontal Partition

A direct mapped cache implies that each memory location can be cached in exactly one cache location. However, each cache line may be mapped into a number of memory locations.

Figure 1:
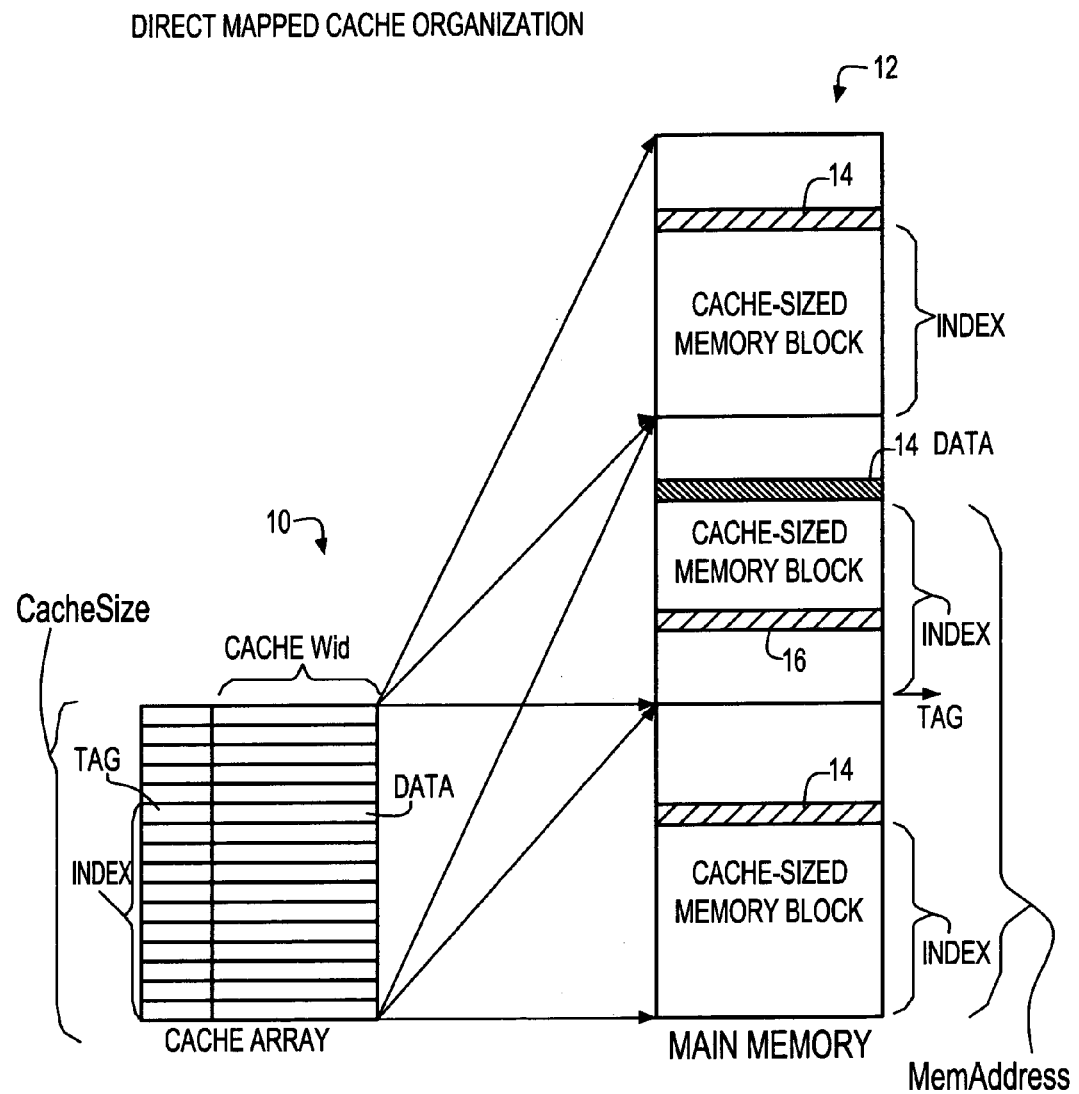
FIG. 1 illustrates a direct mapped cache array.

FIG. 1 shows a representation 10 of a simplified direct mapped cache array of size "CacheSize" and a map of a processor's memory 12. The memory array 12 is broken down into CacheSize blocks. Data in the memory array can be stored in the cache at the same index as it is in memory (offset from the beginning of the CacheSize block of memory). The "Tag" value of that cache location then stores the number of the memory block. This can be mathematically represented as:

Index=MemAddress MOD (CacheSize),

Tag=MemAddress DIV (CacheSize).

The memory locations in the area 14 would also be stored in the same location in the cache, but would have different tag values. A memory location in area 16 would have the same tag as "Data," but be stored at a different index in the cache array.

Figure 2:
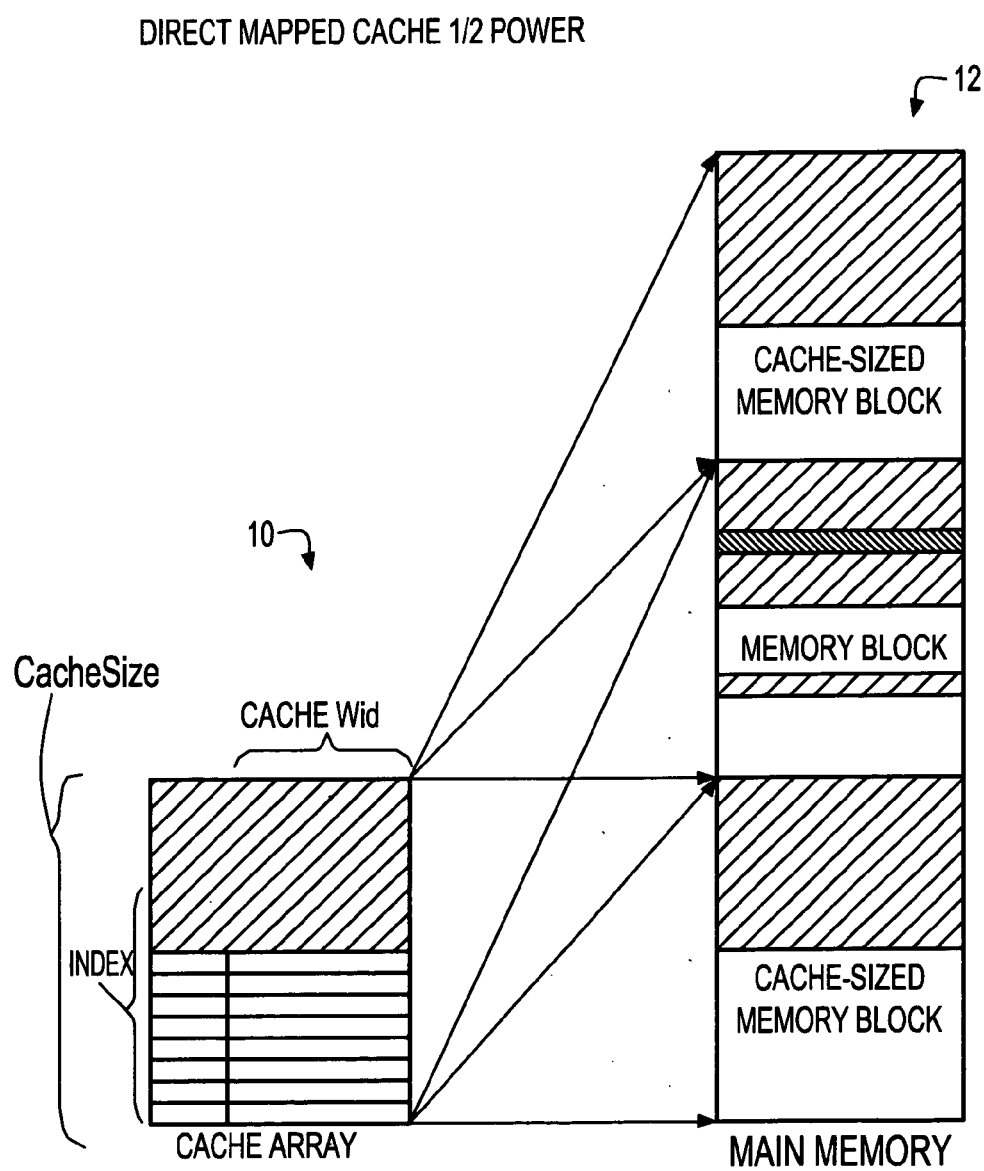
FIG. 2 shows the cache array of FIG. 1 with one-half of the array powered off.

To reduce power, the size of the cache array 10 is reduced. However, with reference to FIG. 2, when this is done, the cache array 10 can no longer hold the contents of any given memory location. In the example of FIG. 2, the location "Data" can no longer be cached.

To solve this problem, "CacheSize" could be changed to reflect the new size of the cache, but then the "index" values would change for all data still in the cache, as would the "Tag" value because of the new size of the cache block.

Figure 3:
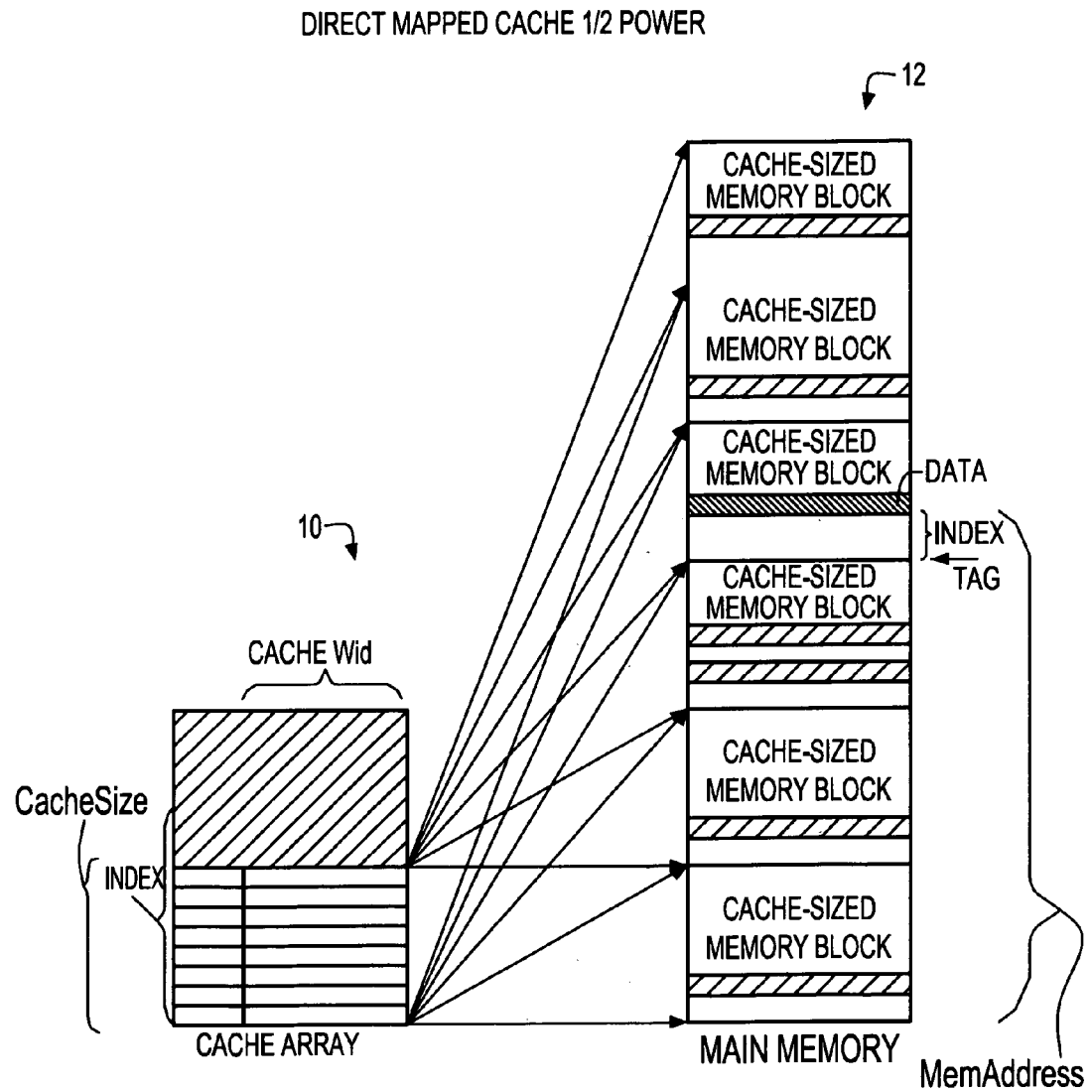
FIG. 3 illustrates the effect of reducing the cache to half size.

FIG. 3 illustrates the effect of reducing the cache 10 to half size. The contents of the entire cache are purged to reorder the cache. If the cache is reduced in size by half, then a bit is also added to each of the caches' "tag" words because there are now twice as many memory blocks.

On reinstating the power to the entire cache, the opposite process occurs. Again, the cache is purged because the Index and the Tag values change due to the change in CacheSize.

If the cache is write-thru (all contents written into the cache are also written to memory), the cache is simply invalidated on a size change. This could be done with minimal impact on a task switch. However, if the cache is a writeback cache (data written to cache is not written to memory until a valid cache line is needed for new data), as are many on processor caches, the cache will contain data not stored elsewhere. This data, referred to as "dirty" data, is written back to memory before the size change takes place.

Vertical Partition

The preferred embodiment, vertical partition, employs a set-associative cache with N "ways," and partitions the caches' power islands along the "ways."

An associative cache can be thought of as multiple direct caches, each of the same size. Each entry in the cache has its own tag and index. An associative cache allows two entries to be cached that have the same index value, but are in different "blocks" of memory.

Figure 4:
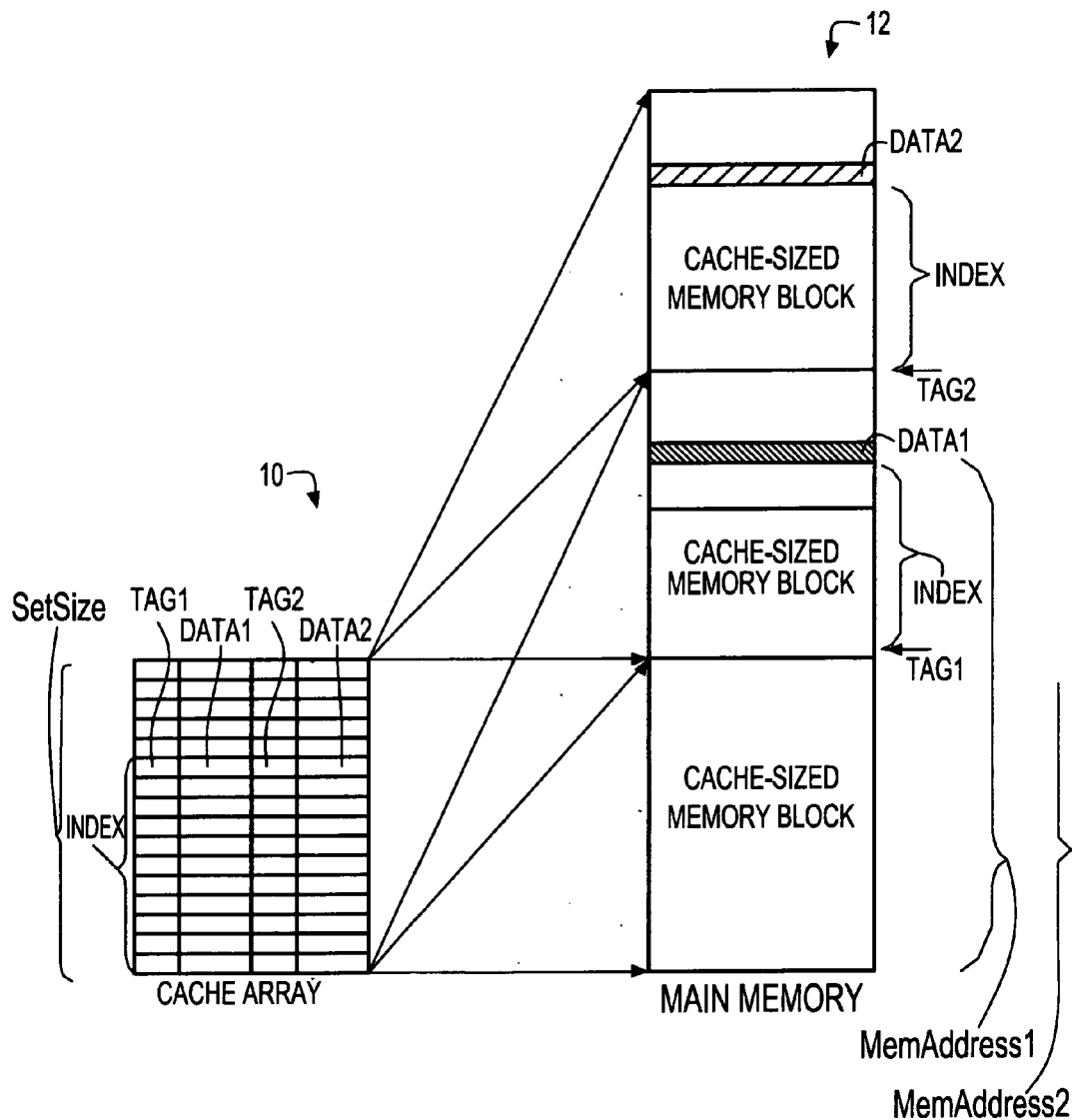
FIG. 4 depicts a 2-way set associative cache organization.

FIG. 4 shows two data elements (Data1 and Data2) that have the same offset (index) from the beginning of their respective memory blocks, but reside in different blocks. If the cache were direct map, only one of these locations could be resident in the cache.

Figure 5:
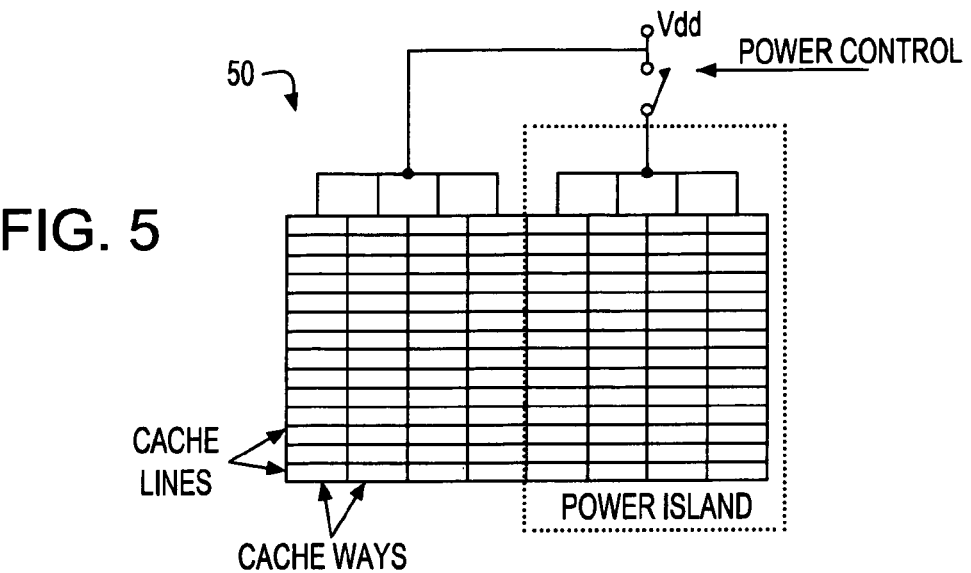
FIG. 5 shows an 8-way set associative cache partitioned in two halves.
Figure 6:
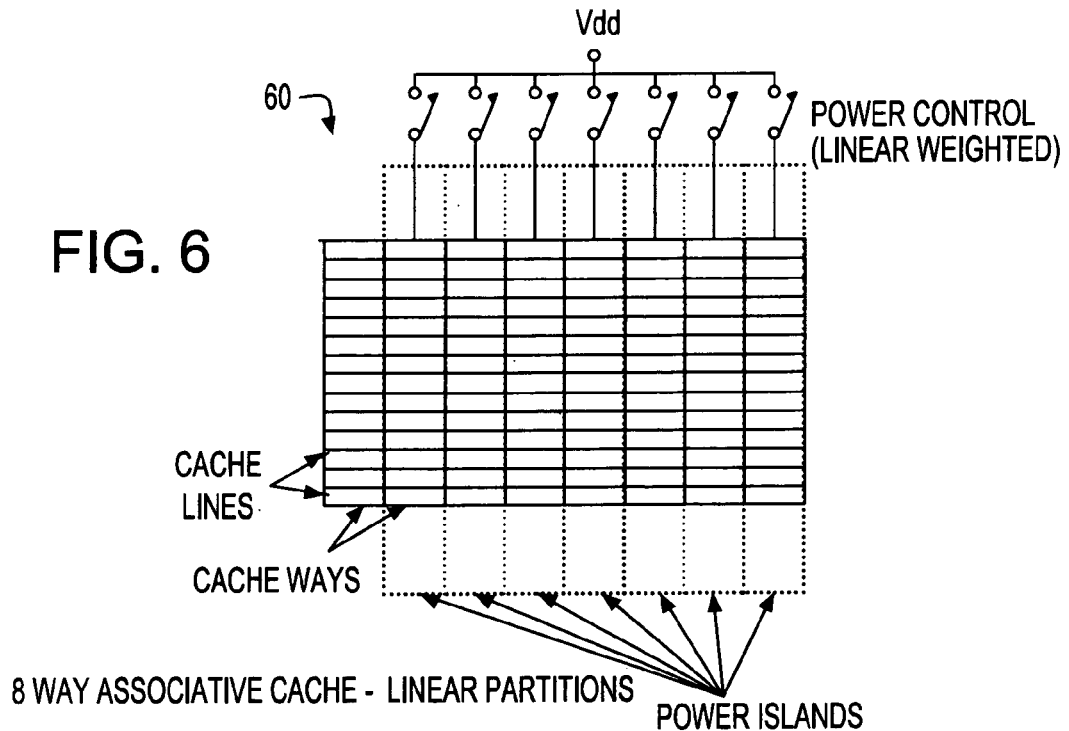
FIG. 6 shows an 8-way set associative cache partitioned into a plurality of equally sized sections.
Figure 7:
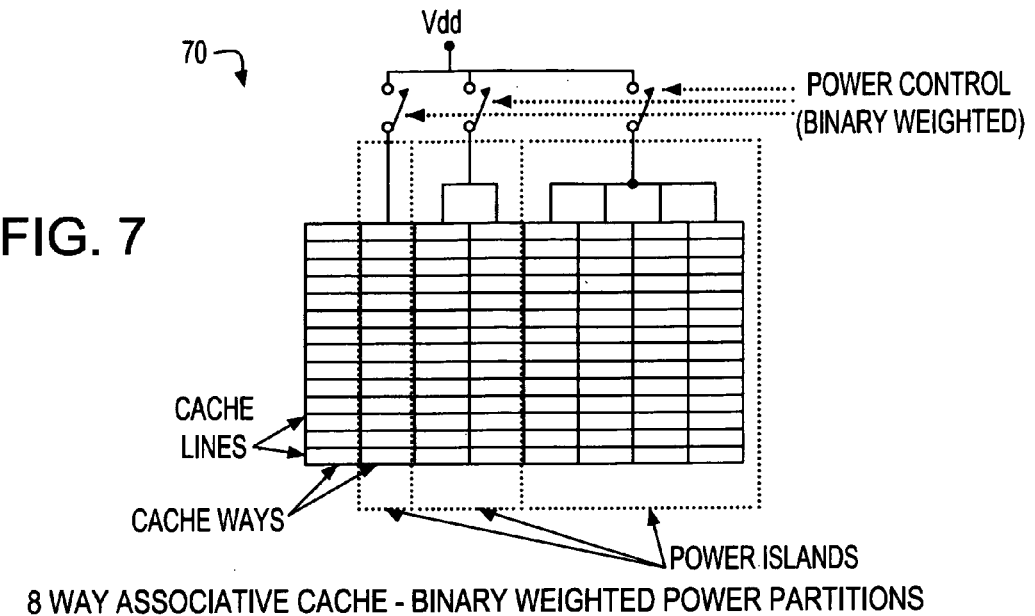
FIG. 7 illustrates an 8-way set associative cache partitioned into a plurality of segments with binary weighting.

In accordance with this embodiment of the invention, each subset of "ways" can be powered individually (or in groups). For example, as illustrated in FIG. 5 at 50, an 8-way set associative cache might be partitioned in two halves, with one half able to be powered off during low powered operation. Other examples (again, using the 8-ways example) might be eight power partitions, as shown in FIG. 6 at 60, or a binary weighted power scheme (including a "permanently" powered way, a variable powered 1-way, 2-way, and 4-way segment) as shown in FIG. 7 at 70. Multiple ways could be taken offline depending on the power savings mode or power/performance trade-off.

Partitioning along "ways" allows the cache partitions to be powered on/off without affecting the address compare logic or the data in other cache partitions.

With vertical partitioning, changing power states does not require a flush and reload of the entire cache, as it does with horizontal partitioning.

Figure 8:
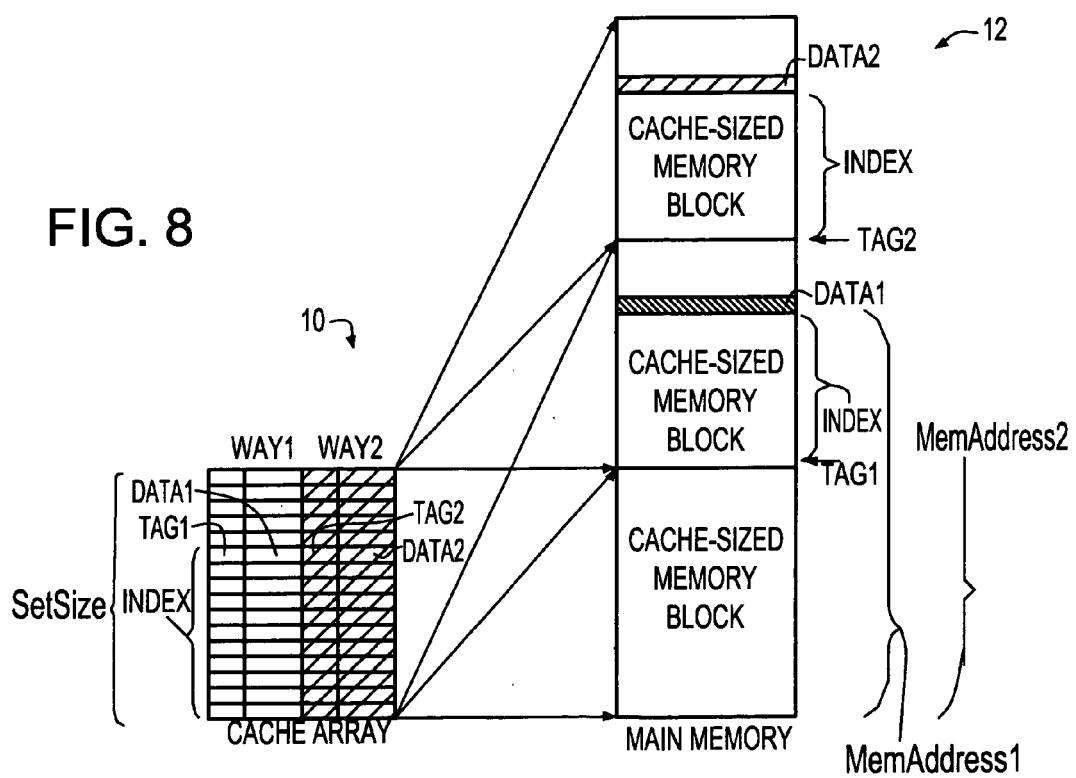
FIG. 8 shows an alternate 2-way set associative cache with way powered off.

In FIG. 8, cache Way 1 still has the same size as the memory block, so all memory addresses are still mapped by the cache. Way 2 has been powered down, so it can no longer cache data. The entire memory space is still cached, however. The associativity of the cache is changed (in this case from two-way to direct mapped), not the block size. It may be noted that, if the cache is a write-back cache, then Data2 must be written back before the power is lost.

When power is reapplied, Way 2 simply has to set all tags to invalid and it can then start loading cache lines.

Maintaining Data Integrity During Cache Power Transitions

In the preferred embodiment, care is taken to insure data integrity before cache elements are powered on or off. On the one hand, during the power-off transition, it is preferred that copies of all data elements exist in an area not to be powered off. In this way, no data are lost when the cache is powered down. On the other hand, when power is reapplied to the cache array, preferably the control bits are set such that each cache entry is invalid.

Write-Through Caches

Write-through caches do not contain data that is not held in a lower level of the memory hierarchy. No special precautions need be taken with such caches, other than to guarantee that any outstanding writes to memory have been completed. Any write buffers (e.g. read-around-write buffers) are to be flushed to main memory before they can be powered down (though it is not necessary to power down such buffers to use this invention).

During the power-on transition, all cache lines in the newly powered-on cache must be marked as "invalid" because data may be lost or obsolete after the power cycle.

Write-Back Caches

Write-back caches pose special challenges because data held in the caches may not exist elsewhere in the system. Therefore, in the preferred embodiment, special requirements are placed on the power-off sequences to guarantee data integrity. That is, all "dirty" lines of the cache are saved before the power can be sequenced off. There are several ways in which this can be done. These include (i) write-thru partition, (ii) forced flush cache lines written back to storage, (iii) forced move, (iv) mode change write back to write-thru, and (iv) replacement policy change change LRU algorithm.

i) Write-Through Partitions

A comparatively simple method to ensure data integrity is to force the controllable cache partitions to be write-thru. For performance reasons, the non-controllable cache partitions can be write-back. The line replacement policy could prefer the non-power controllable write-back ways for writes (dirty lines would tend to be ways that are always powered) and either write-thru or write-back for read operations.

ii) Forced-Flush—Cache Lines Written Back to Storage

During a "forced flush," a state machine (software, hardware, or a combination) searches through the cache "way(s)" to be powered down, in search of dirty cache lines. When a dirty line is found, it is written back to main memory.

iii) Forced Move

A forced move is similar to a forced-flush, except that data (and of course the associated tags) are moved from the way to be powered down to a way that will retain power and that has no "dirty" bit set (the dirty bit indicates that this data does not exist anywhere else and should be retained). If all powered ways are "dirty," a fallback to flush may be needed.

iv) Mode Change—Write-Back to Write-Through

During the power down transition, the cache "way" is set from write-back to write-thru. As lines of the cache are written, the data held in the cache will be written back to storage, thereby creating a copy of the data in system storage. When a line has been written back to memory, its "dirty" bit can be cleared since the main storage contains the same data as the cache line. When all lines in the way have been written, the cache can safely be powered off. Special logic could perform a write-back as lines are touched, improving the write-back time.

v) Replacement Policy Change—Change LRU Algorithm

When a cache partition (way) is to be powered down, the LRU policy can be changed to favor the partitions that are to remain powered. The ways that are to remain powered can be favored over the ways that are not to be powered down. Writes can be prohibited from the ways to be powered down. Reads could still use the ways to be powered down in the interim since there are no data integrity issues if read data are lost from the cache.

Guaranteeing a "Clean" Cache

Before powering off a cache partition, it is preferred to ensure that no lines are dirty. In some modes of operation (e.g. the above discussed "mode change"), it cannot be guaranteed that all dirty cache lines have been written back after an arbitrary time. Thus, special attention may be taken to ensure that all lines are "clean" before dropping power on a cache partition. There are several ways of accomplishing this. These include (i) forced flush or forced move, (ii) busy bit counter, (iii) busy "OR," and (iv) final flush.

i) Forced-Flush or Forced Move (See the Above-Discussed "Forced Move")

After a forced move or flush, the state machine guarantees that there are no dirty bits left.

ii) Busy Bit Counter

A counter is added for each power boundary or cache way and used to count the number of dirty bits. When a dirty bit is changed from "0" to "1" (not dirty to dirty), the counter is incremented. When changed from "1" to "0" (dirty to not dirty), it is decremented. While flushing the cache before powering it down, the counter is tested for zero, indicating that all lines are clean and power may be removed.

iii) Busy—"OR"

All busy bits in the cache partition are ORed to a common busy bit. After a power down request is fielded (and one of the flush methods discussed above started), this signal indicates that all busy cache lines are flushed. This "OR" can be a slow wired "OR," since it's output is in the power down timing path rather than in the critical performance path.

iv) Final Flush

After some time letting the cache flush itself, a forced flush may be used (cache lines may be stagnant, but "busy"). Either a hardware or software initiated flush can be used to clean the remainder of the cache.

v) Further Partitioning the Cache

The cache way may be partitioned again. Assuming a vertically partitioned cache (along a cache way boundary), the cache way can be further subdivided along a "horizontal" direction. Each horizontal segment can then be powered individually for finer power resolution.

Each power partition then would use a cache clearing method (such as one of the above-discussed forced flush/ move, busy-bit counter, or busy OR methods) to indicate a clean sub-segment. Each sub-segment can be powered off as it is cleared. After a prescribed time, the remaining dirty sub-segments can be forced using a software or hardware flush.

Implementation of Power Control

A preferred implementation of power control involves physically partitioning the Vdd or ground planes going into a cache circuit based upon a particular way within the cache. This approach eliminates the AC and DC power associated with the power island. One would partition either the Vdd or ground wires attached to a way of the cache. This involves attaching an NFET, if controlling the ground island, or a PFET, for Vdd, and placing this appropriately sized transistor in series with these power islands. One power island for each way of the cache. The circuits affected by these power islands would be the bits, bit lines, and sense amps for that way. Each of these power island controlling transistors would control a different way. Another circuit that may also contain power controlling partitions is the associated tag for this cache. Again, each way inside the tag would have its power island partitioned and controlled.

Another implementation would be to stop the affected bit lines and sense amps, within the affected way, from precharging. This would save AC power only by not allowing the dynamic circuits in the affected area from precharging and evaluating.

Determining Optimum Cache Size

Given hardware capable of reconfiguring to allow various cache sizes, methods and systems are provided, in accordance with a second aspect of the present invention, to instruct the hardware to go into low power states, or to recover to the full power/performance state. Preferred methods and systems, discussed below in detail, include hardware and software means.

Hardware

The system hardware can monitor system utilization. When the system utilization reaches a certain (low) threshold, the hardware is instructed (for example, by one of the above-discussed methods) to reduce cache size. Upon reaching some second (high) threshold, more cache partitions are powered on and returned to the operational pool. The hardware methods are independent of operating system (OS). Under this scheme, the hardware power detection logic would directly control the sequencing of data saving techniques and power switching. No OS intervention would be required.

HLT Threshold

Many operating systems use a halt (HLT) instruction in the idle thread of the OS. When there are no tasks to be dispatched, the processor is halted, reducing the switching power of the device. When an interrupt is received (signaling work to be done), the processor returns to the operating state and services the interrupt. This process, as used today, does nothing to reduce the DC or "leakage" power seen in large cache arrays since they remain powered on.

To realize DC power savings, a HLT threshold can be implemented in hardware. A timer is started upon encountering a HLT (an existing timer may be used). When the timer expires, the cache is instructed to use one of the above methods of powering off portions of the cache. The time between the HLT and the timer expiring can be used to consolidate cache data (reducing active ways, etc.).

Hit-Rate Threshold

In this procedure, hardware measures hits versus misses over time (rate of change, integrate cache use over time, if it is dropping, reduce cache) either horizontal (address space) or vertical (way). This can be expressed mathematically as:

$$\text{hits/time=decrease cache size,}$$

$$\text{misses/time=increase cache size.}$$

Cache Utilization Threshold

With this procedure, the hardware measures the age (since last access) of the cache content. Cache data above an age threshold indicates that cached data is not of critical value. This data may be moved back to main memory and the cache size reduced.

System Hardware

In this procedure, a signal from hardware (such as closing the lid on a laptop) may be used to directly signal the hardware to go into one or more of the power saving modes.

Software

The software methods and systems for controlling cache size use the operating system or application programs to instruct the hardware which power mode to use. There are three classes of software control Directed, Static, and Dynamic. Software control of power control requires a hardware facility for the software to use to indicate the appropriate power mode. This facility could be a control register bit (or bits).

Directed Power Control

This class of software control over the cache size is similar to the hardware methods, except that the operating system controls the cache power hardware. The hardware does not change power state without intervention from the software/OS. This is an important method for controlling power, as it allows quality of service considerations to be incorporated into the management strategy.

Operating systems today are being designed to manage power by monitoring resources and adjusting system parameters to optimize power while maintaining performance at a required level. For example, by monitoring how much time the processor is idle, the OS can scale frequency and voltage down when lower performance is required (indicated by high idle time) in order to save power. A dynamically sizeable cache could be controlled similarly, such that it is reduced in size when performance requirements are lower, and restored to a larger size when additional performance is needed.

The operating system can also control the cache power hardware via user directed commands or by hardware/OS intervention.

Static Power Control (Known Working Set Size)

Described below are various methods that use static software to determine how much L2 cache is required to run a given software application prior to use and to adjust the cache size accordingly to save power. These methods can include a directive from the user (programmer), the compiler (via local variables), and/or data acquired during performance profiling.

Data Supplied by Developer

With this procedure, the program developer includes hints in the code headers describing cache attributes and performance requirements of the program. In certain cases, the hints might be anything from "don't cache anything" to "time critical." An example of "don't cache anything" might be streaming video data. On the other extreme, "time critical" might be the codec playing the streaming video. That is, whenever the codec is running, the program needs "X" amount of cache.

Developed by Compiler

The second approach, "derived by the compiler," is for the compiler to attempt to derive the working set size. To determine a "best guess" working set size, the compiler bases it's estimation on the space reserved for both local variables (function arguments) and any global variables referenced within the function.

Use Profile Information

The third approach, "use profile information," is to capture working-set information (via profiling) and feed the profiling information back into the compiler using a subsequent compile.

Using either the derived by the compiler, or the use profile information approaches, permits the compiler to derive an estimation of the work-set size.

All of these methods result in the compiler having some knowledge as to the program requirements within each function. At runtime, this working set information (<cacheValue>) can be stored on the stack frame. Whenever a new function is called, the current <cacheValue> can be pushed onto the stack as part of the stack frame, and the new <cacheValue> can be "activated" using the value derived from the techniques described above. As each function completes, the previous <cacheValue> can be popped from the stack which restores the cache requirements from the previous contest.

A processor register may be used to pass information to the hardware. The <cacheValue> can be loaded into this special purpose register. The compiler can generate a special instruction to update the processor register.

At each context switch, the operating system can be responsible to maintain the current cache requirements of each process. When the process is loaded, the current <cacheValue> is loaded into the process table. At each context switch, the current processes <cacheValue> is saved in the process table and the new processes <cacheValue> is loaded into the processor register.

Dynamic Power Control (Unknown Working Set Size)

Described below are methods to evaluate the amount of cache being utilized while the program is running, and to adjust the cache accordingly to save power. These methods involve a learning process with respect to how frequently the cache is being used (measurement) and feeding the information into a dynamic cache adjustment routine (action).

Control cache parameters to dampen reactions to cache size

With this procedure, feedback is used to modify cache policy and size to reduce oscillations while going from power saving modes to full power operation. The OS maintains recent history of cache usage and adjusts the cache modes as needed. Hardware assists can be used to count hit rates, cache fill rates, or other parameters. The OS then makes the power mode determination based on recent events.

Resize Cache on Task Switch

In this procedure, a cache working set size is kept along with the task table. When a new task is swapped in, its cache footprint is loaded into the current cache parameters and the old task's cache information is swapped out with the task. Tables are used to track cache utilization with tasks currently in use.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A power saving cache comprising:
   circuitry to dynamically reduce the logical size of the cache in order to save power by powerinig off selected areas of the cache;
   means for determining an optimal cache size for balancing power and performance; and means for maintaining coherency of data in the cache, as the size of the cache is altered, by ensuring that copies of all data elements in the cache exist in an area of the cache not powered off.

2. A power saving cache according to claim 1, wherein the means for determining an optimal cache size includes hardware means.

3. A power saving cache according to claim 1, wherein the means for determining an optimal cache size includes software means.

4. A power saving cache according to claim 1, wherein some of the data in the cache is modified data, and the means for maintaining coherency includes means for handling said modified data.

5. A power saving cache according to claim 1, wherein the circuitry includes means for partitioning the cache in one of several ways to provide a desired configuration and granularity.

6. A power saving cache according to claim 1, wherein the cache is a set associative cache with N-ways, and the circuitry includes means to partition the cache along said ways.

7. A method of operating a power saving cache comprising:
   using circuitry to dynamically reduce the logical size of the cache in order to save power by powering off selected areas of the cache;
   determining an optimum size for the cache for balancing power and performance given a set of power and performance criteria; and
   maintaining coherency of data in the cache, as the size of the cache is altered. by ensuring that copies of all data elements in the cache exist in an area of the cache not powered off.

8. A method according to claim 7, wherein the cache is a set associative cache including N-ways, and the step of using circuitly to dynamically reduce the logical size of the cache includes the step of using the circuitry to partition the cache along the ways.

9. A method according to claim 8, wherein each of said N ways is individually powered.

10. A method according to claim 9, wherein some of the data in the cache is modified data, and the step of maintaining integrity of the data includes the step of, before powering off one of the sections of the cache, saving any modified data in said one section of the cache.

11. A method according to claim 7, wherein the cache includes a multitude of cache entries and each of said entries is identified by an associated tag, and the step of maintaining coherency of data in the cache includes the step of:
when the size of the cache is altered, purging the entire contents of the cache to reorder the cache, and adding a bit value to each tag.

12. A method of operating a power saving cache, wherein the cache includes data and some of the data in the cache is modified data, the method comprising:
using circuitry to dynamically reduce the logical size of the cache in order to save power;
maintaining integrity of the data as the size of the cache is altered; powering off sections of the cache;
wherein the step of maintaining integrity of the data includes the step of, before powering off one of the sections of the cache, saving any modified data in said one section of the cache and ensuring that copies of all data elements in the cache exist in sections of the cache not powered off; and further comprising the step of determining an optimum size for the cache given a set of power and performance criteria, and wherein the step of using circuitry includes the step of using circuitry to reduce the size of the cache to said optimum size.

13. A method according to claim 12, wherein the step of determining an optimum size includes the step of using one of a predefined set of hardware techniques to determine said optimum size.

14. A method according to claim 12, wherein the cache is used in a processor, and the method includes the further steps of:
running on the processor a cache size adjustment routine; and
feeding information to said routine to determine the optimum size of the cache.

15. A method of operating a power saving cache comprising:
using circuitry to dynamically reduce the logical size of the cache in order to save power by powering off selected areas of the cache and maintaining coherency of data in the cache, as the size of the cache is altered. by ensuring that copies of all data elements in the cache exist in an area of the cache not powered off;
wherein the using step includes the step of partitioning the cache in one of a given number of ways to provide a desired configuration and granularity, said given number of ways comprising (i) equal sized partitions, and (ii) binary weighted with or without a constantly powered way.

* * * * *